United States Patent
Niina et al.

(10) Patent No.: US 10,923,713 B2
(45) Date of Patent: Feb. 16, 2021

(54) NONAQUEOUS ELECTROLYTE SECONDARY BATTERY

(71) Applicant: PANASONIC INTELLECTUAL PROPERTY MANAGEMENT CO., LTD., Osaka (JP)

(72) Inventors: Fumiharu Niina, Hyogo (JP); Takashi Ko, Hyogo (JP); Katsunori Yanagida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 213 days.

(21) Appl. No.: 15/781,759

(22) PCT Filed: Dec. 19, 2016

(86) PCT No.: PCT/JP2016/005178
§ 371 (c)(1),
(2) Date: Jun. 6, 2018

(87) PCT Pub. No.: WO2017/110080
PCT Pub. Date: Jun. 29, 2017

(65) Prior Publication Data
US 2018/0366724 A1 Dec. 20, 2018

(30) Foreign Application Priority Data
Dec. 25, 2015 (JP) ................. 2015-252923

(51) Int. Cl.
| | | |
|---|---|---|
| *H01M 4/36* | (2006.01) | |
| *H01M 4/525* | (2010.01) | |
| *H01M 4/505* | (2010.01) | |
| *H01M 10/0525* | (2010.01) | |
| *H01M 4/587* | (2010.01) | |
| *H01M 10/0568* | (2010.01) | |
| *H01M 4/485* | (2010.01) | |
| *H01M 4/58* | (2010.01) | |
| *H01M 4/02* | (2006.01) | |

(52) U.S. Cl.
CPC .......... *H01M 4/366* (2013.01); *H01M 4/485* (2013.01); *H01M 4/505* (2013.01); *H01M 4/525* (2013.01); *H01M 4/587* (2013.01); *H01M 4/5825* (2013.01); *H01M 10/0525* (2013.01); *H01M 10/0568* (2013.01); *H01M 2004/028* (2013.01)

(58) Field of Classification Search
CPC ........ H01M 4/36; H01M 4/525; H01M 4/505; H01M 4/58; H01M 10/0525
See application file for complete search history.

(56) References Cited

U.S. PATENT DOCUMENTS

| | | | | |
|---|---|---|---|---|
| 2002/0051910 A1* | 5/2002 | Yoshimura | ............. | C08G 61/02 429/249 |
| 2004/0018135 A1* | 1/2004 | Adamson | ................ | C01B 25/30 423/313 |
| 2010/0279165 A1* | 11/2010 | Lemmon | ................. | H01M 4/38 429/102 |
| 2015/0303473 A1* | 10/2015 | Theivanayagam | . | H01M 4/5825 252/182.1 |
| 2016/0293936 A1 | 10/2016 | Takebayashi | | |

FOREIGN PATENT DOCUMENTS

| | | |
|---|---|---|
| JP | 2008-270199 A | 11/2008 |
| JP | 2012-94454 A | 5/2012 |
| JP | 2013-69580 A | 4/2013 |
| JP | 2015-103332 A | 6/2015 |
| WO | 2014/128903 A1 | 8/2014 |

OTHER PUBLICATIONS

International Search Report dated Mar. 14, 2017, issued in counterpart International Application No. PCT/JP2016/005178 (2 pages).

\* cited by examiner

*Primary Examiner* — Kenneth J Douyette
(74) *Attorney, Agent, or Firm* — Westerman, Hattori, Daniels & Adrian, LLP

(57) ABSTRACT

A nonaqueous electrolyte secondary battery includes a positive electrode, a negative electrode, and a nonaqueous electrolyte. The positive electrode contains a lithium transition metal oxide, at least one element of a group 5 element and group 6 element in the periodic table, and a phosphoric acid compound. The nonaqueous electrolyte contains a lithium salt containing a P—O bond and a P—F bond.

8 Claims, No Drawings

NONAQUEOUS ELECTROLYTE SECONDARY BATTERY

TECHNICAL FIELD

The present disclosure relates to a nonaqueous electrolyte secondary battery.

BACKGROUND ART

For the purpose of enhancing the safety of batteries during overcharge, for example, Patent Literature 1 proposes a nonaqueous electrolyte secondary battery including a positive electrode containing a negative electrode active material surface-coated with W, Mo, a Zr compound, and a phosphoric acid compound.

Furthermore, for the purpose of improving rate characteristics after high-temperature storage, for example, Patent Literature 2 proposes a nonaqueous electrolyte secondary battery including a nonaqueous electrolyte containing at least one lithium salt selected from the group consisting of a lithium difluorophosphate salt, a lithium bis(fluorosulfonyl) amide salt, and a lithium fluorosulfonate salt and a cyclic disulfonic ester.

CITATION LIST

Patent Literature

PTL 1: International Publication No. WO 2014/128903
PTL 2: Japanese Published Unexamined Patent Application No. 2012-94454

SUMMARY OF INVENTION

However, in the above conventional techniques, low-temperature regeneration characteristics representing input characteristics at low temperature have been insufficient in some cases.

It is an object of the present disclosure to provide a nonaqueous electrolyte secondary battery with improved low-temperature regeneration characteristics.

The present disclosure provides a nonaqueous electrolyte secondary battery including a positive electrode, a negative electrode, and a nonaqueous electrolyte. The positive electrode contains a lithium transition metal oxide, at least one element of a group 5 element and group 6 element in the periodic table, and a phosphoric acid compound. The nonaqueous electrolyte contains a lithium salt containing a P—O bond and a P—F bond.

According to the present disclosure, a nonaqueous electrolyte secondary battery with improved low-temperature regeneration characteristics can be provided.

DESCRIPTION OF EMBODIMENTS

The inventors have performed intensive investigations and, as a result, have found that low-temperature regeneration characteristics of a nonaqueous electrolyte secondary battery can be improved in such a manner that a specific compound is added to a positive electrode and a specific lithium salt is added to a nonaqueous electrolyte, thereby conceiving inventions of aspects described below.

An aspect of the present disclosure provides a nonaqueous electrolyte secondary battery including a positive electrode, a negative electrode, and a nonaqueous electrolyte. The positive electrode contains a lithium transition metal oxide, at least one element of a group 5 element and group 6 element in the periodic table, and a phosphoric acid compound. The nonaqueous electrolyte contains a lithium salt containing a P—O bond and a P—F bond. According to an aspect of the present disclosure, low-temperature regeneration characteristics can be improved. Incidentally, the term "group 5/6 element" as used herein refers to at least one element of a group 5 element and a group 6 element.

A mechanism in which low-temperature regeneration characteristics are improved is not sufficiently clear and is probably as described below. A lithium salt, containing a P—O bond and a P—F bond, in a nonaqueous electrolyte is reductively decomposed on a surface of a negative electrode or the like by the charge and discharge of a battery, whereby decomposition products are produced. A group 5/6 element contained in a positive electrode is dissolved in the nonaqueous electrolyte by the charge and discharge of the battery and migrates toward the negative electrode. A coating containing the decomposition products and the group 5/6 element is formed on the negative electrode surface. In this course, when both of the group 5/6 element and a phosphoric acid compound are present in the positive electrode, it is conceivable that the dissolution and precipitation modes of the group 5/6 element vary and a low-resistance coating is formed on the negative electrode surface. The formation of such a low-resistance coating probably improves the low-temperature regeneration characteristics. Herein, low-temperature is, for example, −30° C. or lower.

In the nonaqueous electrolyte secondary battery that is another aspect of the present disclosure, the negative electrode contains a graphitic carbon material and a noncrystalline carbon material fixed to the surface of the graphitic carbon material. This probably allows a coating with lower resistance to be formed on the negative electrode surface as compared to the case of using a graphitic carbon material having no noncrystalline carbon material fixed to the surface thereof, whereby the low-temperature regeneration characteristics are further improved.

In the nonaqueous electrolyte secondary battery that is another aspect of the present disclosure, the phosphoric acid compound is a phosphoric acid compound containing a metal element and hydrogen element. The phosphoric acid compound is a phosphoric acid compound represented by the general formula $M_xH_yPO_4$ (M is the metal element, x is 1 to 2, and y is 1 to 2). This probably allows a coating with lower resistance to be formed on the negative electrode surface as compared to a phosphoric acid compound containing none of the metal element and hydrogen element, whereby the low-temperature regeneration characteristics are further improved.

In the nonaqueous electrolyte secondary battery that is another aspect of the present disclosure, the lithium salt is a lithium salt represented by the general formula $Li_xP_yO_zF_\alpha$ (x is an integer of 1 to 4, y is 1 or 2, z is an integer of 1 to 8, and α is an integer of 1 to 4). The lithium salt is lithium monofluorophosphate or lithium difluorophosphate. This probably allows a coating with lower resistance to be formed on the negative electrode surface, whereby the low-temperature regeneration characteristics are further improved.

Embodiments of the present disclosure are described below. Incidentally, the embodiments are examples and the present disclosure is not limited to the embodiments below.

(Configuration of Nonaqueous Electrolyte Secondary Battery)

A nonaqueous electrolyte secondary battery that is an example of an embodiment includes a negative electrode, a positive electrode, and a nonaqueous electrolyte. A separator is preferably placed between the positive electrode and the negative electrode. An example of the structure of the nonaqueous electrolyte secondary battery is a structure in which an electrode assembly formed by winding the positive electrode and the negative electrode with the separator therebetween and the nonaqueous electrolyte are housed in an enclosure. Alternatively, another type of electrode assembly such as a stacked electrode assembly formed by stacking the positive electrode and the negative electrode with the separator therebetween may be used instead of a wound electrode assembly. The nonaqueous electrolyte secondary battery may be of any type including, for example, a cylinder type, a prism type, a coin type, a button type, and a laminate type.

(Positive Electrode)

The positive electrode is composed of, for example, a positive electrode current collector made of metal foil or the like and a positive electrode mix layer or positive electrode mix layers formed on a single surface or both surfaces, respectively, of the positive electrode current collector. The positive electrode current collector used may be foil of a metal, such as aluminium, stable within the potential range of the positive electrode, a film including a surface layer made of the metal, or the like.

The positive electrode mix layer or layers contain a lithium transition metal oxide that is a positive electrode active material, a group 5/6 element, and a phosphoric acid compound. The positive electrode mix layer or layers preferably further contain a conductive agent and a binding material.

[Lithium Transition Metal Oxide]

The lithium transition metal oxide is a metal oxide containing at least lithium (Li) and a transition metal element and can be represented by, for example, the general formula $Li_xMe_yO_2$. In the above general formula, Me represents transition metal elements such as nickel (Ni), cobalt (Co), and manganese (Mn); x is, for example, 0.8 to 1.2; and y varies depending on the type and oxidation number of Me and is, for example, 0.7 to 1.3. The lithium transition metal oxide is particularly preferably lithium nickel-cobalt-manganate, which contains Ni, Co, and Mn.

An additive element in the lithium transition metal oxide is not limited to nickel (Ni), cobalt (Co), or manganese (Mn). The lithium transition metal oxide may contain another additive element. Examples of the other additive element include alkali metal elements other than lithium; transition metal elements other than Mn, Ni, and Co; alkaline-earth metal elements; group 12 elements; group 13 elements; and group 14 elements. Particular examples of the other additive element include zirconium (Zr), boron (B), magnesium (Mg), aluminium (Al), titanium (Ti), iron (Fe), copper (Cu), zinc (Zn), tin (Sn), sodium (Na), potassium (K), barium (Ba), strontium (Sr), and calcium (Ca). Among these, Zr is preferable. Containing Zr probably stabilizes the crystal structure of the lithium transition metal oxide to enhance the high-temperature durability and cycle characteristics of the positive electrode mix layer or layers. The content of Zr in the lithium transition metal oxide is preferably 0.05 mol % to 10 mol % with respect to the total amount of metals excluding Li, more preferably 0.1 mol % to 5 mol %, and particularly preferably 0.2 mol % to 3 mol %.

The particle size of the lithium transition metal oxide is not particularly limited and is preferably 2 μm to 30 μm. When particles of the lithium transition metal oxide are secondary particles formed by the aggregation of primary particles, the secondary particles preferably have the above size and the primary particles preferably have a size of, for example, 50 nm to 10 μm. The particle size of the lithium transition metal oxide may be a value obtained in such a manner that, for example, 100 particles of the lithium transition metal oxide observed with a scanning electron microscope (SEM) are randomly extracted and the sizes of the 100 particles are averaged on the assumption that the average of the lengths of the major and minor axes of each particle is the size of the particle. The BET specific surface area of the lithium transition metal oxide is not particularly limited and is preferably 0.1 $m^2$/g to 6 $m^2$/g. Incidentally, the BET specific surface area of the lithium transition metal oxide can be measured with a known BET specific surface area analyzer.

[Group 5/6 Element]

The group 5/6 element may be present in the vicinity of the lithium transition metal oxide and may be contained in any form. For example, a compound of the group 5/6 element may be attached to the surfaces of the lithium transition metal oxide particles, the group 5/6 element may be contained in the lithium transition metal oxide, or both may be present. The group 5/6 element is particularly preferably contained in the lithium transition metal oxide because a low-resistance coating can be formed on the negative electrode and low-temperature regeneration characteristics can be further improved.

Elements belonging to group 5 of the periodic table are vanadium (V), niobium (Nb), tantalum (Ta), and dubnium (Db). Elements belonging to group 6 of the periodic table are chromium (Cr), molybdenum (Mo), tungsten (W), and seaborgium (Sg). Among these, W, Nb, Ta, Cr, and Mo are preferable; W and Nb are more preferable; and W is particularly preferable because the low-resistance coating can be formed on the negative electrode and the low-temperature regeneration characteristics can be further improved. In the case where the group 5/6 element compound is attached to the surfaces of the lithium transition metal oxide particles, examples of the group 5/6 element compound include tungsten oxides such as $WO_2$, $WO_3$, and $W_2O_5$; niobium oxides such as NbO, $Nb_2O_3$, $NbO_2$, and $Nb_2O_5$; tungsten oxide salts such as lithium tungstate; and niobium oxide salts such as lithium niobate. Among the tungsten oxides, $WO_3$, in which the oxidation number is most stable and is hexavalent, is preferable. Among the niobium oxides, $NbO_2$, in which the oxidation number is stable and is tetravalent, and $Nb_2O_5$, in which the oxidation number is pentavalent, are preferable.

The group 5/6 element compound can be attached to the surfaces of the active material particles by, for example, mechanically mixing the group 5/6 element compound with the positive electrode active material. The group 5/6 element compound may be added in a step of preparing positive electrode mix slurry by kneading the conductive agent and the binding material.

In the case of attaching the group 5/6 element compound to the lithium transition metal oxide, the compound is preferably added such that the group 5/6 element in the compound accounts for 0.05 mol % to 10 mol % of the amount of metals (that is, a transition metal and the additive element), excluding Li, in the lithium transition metal oxide, more preferably 0.1 mol % to 5 mol %, and particularly preferably 0.2 mol % to 3 mol %. When the content of the group 5/6 element is within the range, the formation of the low-resistance coating on the negative electrode is further accelerated and the low-temperature regeneration characteristics can be further improved as compared to when the content of the group 5/6 element is outside the range.

The particle size of the group 5/6 element compound is preferably less than the particle size of the lithium transition metal oxide and is particularly preferably 25% or less of the particle size of the oxide. The particle size of the group 5/6 element compound is, for example, 50 nm to 10 µm. When the particle size thereof is within the range, it is conceivable that the dispersion of the group 5/6 element in the positive electrode mix layer or layers is maintained good and the dissolution of the group 5/6 element from the positive electrode is performed well. When the group 5/6 element compound is present in the form of aggregates, the particle size of the compound is the size of particles (primary particles) that are the minimum units forming aggregates.

On the other hand, when the lithium transition metal oxide contains the group 5/6 element, the lithium transition metal oxide and the group 5/6 element are preferably formed into a solid solution. Portions of the group 5/6 element may be precipitated at the interfaces between primary particles of the positive electrode active material or on the surfaces of secondary particles thereof. An example of the lithium transition metal oxide containing the group 5/6 element is one containing the group 5/6 element in addition to the transition metal elements, such as nickel (Ni), cobalt (Co), and manganese (Mn), represented by Me in the general formula $Li_xMe_yO_2$ or the like. In particular, it is preferable that the lithium transition metal oxide contains Ni, Co, and Mn and further contains W or Nb. It is more preferable that the lithium transition metal oxide contains Ni, Co, and Mn and further contains W.

The lithium transition metal oxide containing the group 5/6 element can be synthesized in such a manner that, for example, a composite oxide containing Ni, Co, Mn, or the like, a lithium compound such as lithium hydroxide, and an oxide of the group 5/6 element are mixed together and the obtained mixture is fired.

The content of the group 5/6 element in the lithium transition metal oxide containing the group 5/6 element is preferably 0.05 mol % to 10 mol % with respect to the total amount of metals (that is, a transition metal and the additive element), excluding Li, in the lithium transition metal oxide and more preferably 0.1 mol % to 5 mol %. When the content of the group 5/6 element therein is within the range, the formation of the low-resistance coating on the negative electrode surface is further accelerated and the low-temperature regeneration characteristics can be further improved as compared to when the content of the group 5/6 element is outside the range.

[Phosphoric Acid Compound]

The phosphoric acid compound is not particularly limited and may be a phosphate or a condensed phosphate. Examples of the phosphoric acid compound include lithium phosphate, sodium phosphate, potassium phosphate, calcium phosphate, magnesium phosphate, barium phosphate, manganese phosphate, cobalt phosphate, nickel phosphate, dilithium hydrogen phosphate, lithium dihydrogen phosphate, disodium hydrogen phosphate, sodium dihydrogen phosphate, dipotassium hydrogen phosphate, potassium dihydrogen phosphate, calcium hydrogen phosphate, magnesium hydrogen phosphate, barium hydrogen phosphate, manganese hydrogen phosphate, lithium pyrophosphate, magnesium pyrophosphate, lithium metaphosphate, and magnesium metaphosphate. Among these, a phosphoric acid compound containing a metal element and hydrogen element is preferable, a phosphoric acid compound represented by the general formula $M_xH_yPO_4$ (M is a metal element, x is 1 to 2, and y is 1 to 2) is more preferable, and magnesium hydrogen phosphate ($MgHPO_4$) and manganese hydrogen phosphate ($MnHPO_4$) are particularly preferable. Incidentally, these compounds may be present in the form of a hydrate.

As described above, the group 5/6 element is dissolved from the positive electrode and migrates to the negative electrode during the charge and discharge of the battery and the lithium salt, which contains the P—O bond and the P—F bond, is reductively decomposed on the negative electrode surface during the charge and discharge of the battery, whereby a coating containing the group 5/6 element and decomposition products derived from the lithium salt is formed on the negative electrode. Herein, when the phosphoric acid compound is contained in the positive electrode, it is conceivable that the dissolution mode of the group 5/6 element in the positive electrode and the decomposition rate of the lithium salt, which contains the P—O bond and the P—F bond, are varied by the catalysis of the phosphoric acid compound and a coating having low resistance is formed and the low-temperature regeneration characteristics are improved as compared to when the phosphoric acid compound is not present in the positive electrode. In particular, when the phosphoric acid compound in the positive electrode is the phosphoric acid compound containing the metal element and hydrogen element, the dissolution mode of the group 5/6 element in the positive electrode and the decomposition rate of the lithium salt, which contains the P—O bond and the P—F bond, are more appropriate; hence, a coating having lower resistance is formed and the low-temperature regeneration characteristics are further improved.

The content of the phosphoric acid compound is preferably 0.03% by mass to 10% by mass with respect to the amount of the lithium transition metal oxide, which is the positive electrode active material, and more preferably 0.1% by mass to 8% by mass. The content of the phosphoric acid compound is preferably 0.01% by mass to 3% by mass with respect to the amount of the lithium transition metal oxide in terms of phosphorus (P) element and more preferably 0.03% by mass to 2% by mass. When the content of the phosphoric acid compound is too small, no low-resistance coating may possibly be sufficiently formed on the negative electrode surface. When the content of the phosphoric acid compound is too large, the efficient transfer of electrons in the positive electrode active material may possibly be inhibited.

The particle size of the phosphoric acid compound is, for example, 50 nm to 10 µm. When the particle size thereof is within the range, the dispersion of the phosphoric acid compound in the positive electrode mix layer or layers is maintained good. When the phosphoric acid compound is present in the form of aggregates, the particle size of the phosphoric acid compound is the size of particles (primary particles) that are the minimum units forming aggregates.

The phosphoric acid compound can be attached to the surfaces of the active material particles by, for example, mechanically mixing the phosphoric acid compound with the positive electrode active material. Alternatively, the phosphoric acid compound may be mixed in the positive electrode mix layer or layers in such a manner that the phosphoric acid compound is added in the step of preparing the positive electrode mix slurry by kneading the conductive agent and the binding material.

[Conductive Agent]

Examples of the conductive agent include carbon materials such as carbon black, acetylene black, Ketjenblack, and graphite. These may be used alone or in combination.

[Binding Material]

Examples of the binding material include fluorinated resins such as polytetrafluoroethylene (PTFE) and polyvinylidene fluoride (PVdF), polyacrylonitrile (PAN), polyimide resins, acrylic resins, and polyolefinic resins.

These resins may be used in combination with carboxymethylcellulose (CMC), a salt thereof (that may be CMC-Na, CMC-K, CMC-NH$_4$, a partially neutralized salt, or the like), polyethylene oxide (PEO), or the like. These may be used alone or in combination.

(Nonaqueous Electrolyte)

The nonaqueous electrolyte contains a nonaqueous solvent and an electrolyte salt dissolved in the nonaqueous solvent. The electrolyte salt includes the lithium salt, which contains the P—O bond and the P—F bond.

The lithium salt, which contains the P—O bond and the P—F bond, is preferably a lithium salt represented by the general formula $Li_xP_yO_zF_\alpha$ (x is an integer of 1 to 4, y is 1 or 2, z is an integer of 1 to 8, and α is an integer of 1 to 4) and is more preferably lithium monofluorophosphate or lithium difluorophosphate. Since the lithium salt, which is reductively decomposed on the negative electrode during the charge and discharge of the battery as described above, contains the P—O bond and the P—F bond, it is conceivable that the lithium salt is inhibited from being excessively reductively decomposed on the negative electrode and the resistance of a coating formed on the negative electrode can be reduced.

The content of the lithium salt, which contains the P—O bond and the P—F bond, is preferably 0.01 mol to 0.5 mol per liter of the nonaqueous solvent and more preferably 0.02 mol to 0.2 mol. When the content of the lithium salt, which contains the P—O bond and the P—F bond, is less than 0.01 mol, the amount of the lithium salt reductively decomposed on the negative electrode is small. When the content of the lithium salt is more than 0.5 mol, the amount of the lithium salt reductively decomposed thereon is large. Both cases affect the reduction in resistance of the coating formed on the negative electrode in some cases.

The electrolyte salt may include another electrolyte salt in addition to the lithium salt, which contains the P—O bond and the P—F bond. Examples of the other electrolyte salt include $LiBF_4$; $LiClO_4$; $LiPF_6$; $LiAsF_6$; $LiSbF_6$; $LiAlCl_4$; LiSCN; $LiCF_3SO_3$; $LiC(C_2F_5SO_2)$; $LiCF_3CO_2$; $Li(P(C_2O_4)F_4)$; $Li(P(C_2O_4)F_2)$; $LiPF_{6-x}(C_nF_{2n+1})_x$ (1≤x≤6 and n is 1 or 2); $LiB_{10}Cl_{10}$; LiCl; LiBr; LiI; chloroborane lithium; lithium lower aliphatic carboxylates; borates such as $Li_2B_4O_7$, $Li(B(C_2O_4)_2)$ [lithium-bisoxalate borate (LiBOB)], and $Li(B(C_2O_4)F_2)$; and imide salts such as $LiN(FSO_2)_2$ and $LiN(C_lF_{2l+1}SO_2)(C_mF_{2m+1}SO_2)$ {l and m are integers greater than or equal to 1}. The lithium salt may be used in combination with one or more of these salts. The concentration of the other electrolyte salt is preferably 0.8 mol to 1.8 mol per liter of the nonaqueous solvent.

Cyclic carbonates, linear carbonates, and carboxylates can be exemplified as the nonaqueous solvent. In particular, the following compounds can be cited: cyclic carbonates such as ethylene carbonate (EC), propylene carbonate (PC), butylene carbonate, and vinylene carbonate; linear carbonates such as dimethyl carbonate (DMC), methyl ethyl carbonate (MEC), diethyl carbonate (DEC), methyl propyl carbonate, ethyl propyl carbonate, and methyl isopropyl carbonate; linear carboxylates such as methyl propionate (MP), ethyl propionate, methyl acetate, ethyl acetate, and propyl acetate; and cyclic carboxylates such as γ-butyrolactone (GBL) and γ-valerolactone (GVL).

The nonaqueous electrolyte may contain ethers. Examples of ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers and linear ethers such as diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

The nonaqueous electrolyte may contain nitriles. Examples of the nitriles include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

The nonaqueous electrolyte may contain a halogen-substituted compound. Examples of the halogen-substituted compound include fluorinated cyclic carbonates such as 4-fluoroethylene carbonate (FEC), fluorinated linear carbonates, and fluorinated linear carboxylates such as methyl 3,3,3-trifluoropropionate (FMP).

(Negative Electrode)

The negative electrode is preferably composed of, for example, a negative electrode current collector made of metal foil or the like and a negative electrode mix layer or negative electrode mix layers formed on a single surface or both surfaces, respectively, of the current collector. The negative electrode current collector used may be foil of a metal stable within the potential range of the negative electrode, a film including a surface layer made of the metal, or the like. The negative electrode mix layer or layers preferably contain a negative electrode active material, a binding material, and the like.

The negative electrode active material is one capable of reversely storing and releasing lithium ions. Examples of the negative electrode active material include graphitic materials such as natural graphite and synthetic graphite; noncrystalline carbon materials; metals, such as Si and Sn, alloyed with lithium; alloy materials; and metal composite oxides. These may be used alone or in combination. In particular, a carbon material containing a graphitic material and a noncrystalline carbon material fixed to the surface of the graphitic carbon material is preferably used because the low-resistance coating is likely to be formed on the negative electrode surface.

The term "graphitic carbon material" refers to a carbon material with a developed graphite crystal structure and includes natural graphite, synthetic graphite, and the like. These may be flaky or may have been spheroidized. Synthetic graphite is prepared in such a manner that a raw material such as petroleum, coal pitch, or coke is heat-treated at 2,000° C. to 3,000° C. or higher in an Acheson furnace, a graphite heater furnace, or the like. The d(002) interplanar spacing determined by X-ray diffraction is preferably 0.338 nm or less. The crystal thickness (Lc (002)) in the c-axis direction is preferably 30 nm to 1,000 nm.

The term "noncrystalline carbon material" refers to a carbon material which has an undeveloped graphite crystal structure and which is amorphous or microcrystalline carbon with a turbostratic structure and particularly refers to one having a d(002) interplanar spacing of 0.342 nm or more as determined by X-ray diffraction. Examples of the noncrystalline carbon material include hard carbon (non-graphitizable carbon), soft carbon (graphitizable carbon), carbon black, carbon fibers, and activated carbon. Methods for producing these materials are not particularly limited. These materials are obtained by carbonizing, for example, resins or resin compositions. The following materials can be used: phenolic thermosetting resins, thermoplastic resins such as polyacrylonitrile, petroleum or coal tar, petroleum or coal pitch, and the like. For example, carbon black is obtained by pyrolyzing a hydrocarbon serving as a raw material. Pyrolysis processes include thermal processes, acetylene decomposition processes, and the like. Incomplete combustion processes include contact processes, lamp black processes, gas furnace processes, oil furnace processes, and the like. Examples of carbon black produced by these processes include acetylene black, Ketjenblack, thermal black, and furnace black. These noncrystalline carbon materials may be surface-coated with different noncrystalline or amorphous carbon.

The noncrystalline carbon material is preferably present in such a state that the noncrystalline carbon material is fixed to the surface of the graphitic carbon material. The term "fixed" as used herein expresses a chemically/physically bonded state and means that the graphitic carbon material and the noncrystalline carbon material are not separated from each other even if the negative electrode active material of the present invention is stirred in water or an organic solvent.

A coating with low reaction overvoltage is formed on the surface of the noncrystalline carbon material by fixing the noncrystalline carbon material, which has a larger reaction area as compared to graphitic carbon and also has a multi-orientational microstructure, to the surface of the graphitic carbon material. Therefore, it is conceivable that the reaction overvoltage of the whole graphitic carbon material for the intercalation/deintercalation of Li is reduced. Furthermore, since the noncrystalline carbon material has a nobler reaction potential as compared to the graphitic carbon material and therefore reacts preferentially with the group 5/6 element dissolved from the positive electrode, a good coating with more excellent lithium ion permeability is formed on the surface of the noncrystalline carbon material. Therefore, it is conceivable that the reaction resistance of the whole graphitic carbon material for the intercalation/deintercalation of Li is further reduced.

The ratio between the graphitic carbon material and the noncrystalline carbon material is not particularly limited. The proportion of the noncrystalline carbon material, which is excellent in Li storage performance, is preferably high. The percentage of the noncrystalline carbon material in the active material is preferably 0.5 wt % or more and more preferably 2 wt % or more. However, when the noncrystalline carbon material is excessive, the noncrystalline carbon material cannot be uniformly fixed to the surface of graphite. Therefore, the upper limit is preferably determined with this in mind.

A method for fixing the noncrystalline carbon to the graphitic carbon material is a method in which petroleum or coal tar or pitch is added to the noncrystalline carbon material and is mixed with the graphitic carbon material, followed by heat treatment. In addition, there are a mechanofusion method in which graphite particles are coated with solid noncrystalline carbon by applying compressive shear stress between the graphite particles and solid noncrystalline carbon; a solid-phase method in which coating is performed by a sputtering process; a liquid-phase method in which noncrystalline carbon is dissolved in a solvent such as toluene and graphite is immersed therein, followed by heat treatment; and the like.

The primary particle size of the noncrystalline carbon is preferably small from the viewpoint of the diffusion length of Li. The specific surface area thereof is preferably large because the reaction surface area for the intercalation of Li is large. However, an excessively large specific surface area causes an excessive reaction, leading to an increase in resistance. Therefore, the specific surface area of the noncrystalline carbon is preferably 5 $m^2/g$ to 200 $m^2/g$. In order to reduce the excessive specific surface area, the primary particle size thereof is preferably 20 nm to 1,000 nm and more preferably 40 nm to 100 nm. A structure other than a hollow structure in which a hollow is present in a particle is preferable.

[Binding Material]

As is the case with the positive electrode, the binding agent used may be a fluorinated resin, PAN, a polyimide resin, an acrylic resin, a polyolefin resin, or the like. In the case of using an aqueous solvent to prepare negative electrode mix slurry, the following material is preferably used: styrene-butadiene rubber (SBR), CMC, a salt thereof, polyacrylic acid (PAA), a salt thereof (that may be PAA-Na, PAA-K, or a partially neutralized salt), polyvinyl alcohol (PVA), or the like.

(Separator)

The separator used is a porous sheet having ionic permeability and insulation properties or the like. Examples of the porous sheet include microporous thin films, fabrics, and nonwoven fabrics. The separator is preferably made of an olefin resin such as polyethylene or polypropylene, cellulose, or the like. The separator may be a laminate including a cellulose fiber layer and a thermoplastic resin fiber layer made of the olefin resin or the like. The separator may be a multilayer separator including a polyethylene layer and a polypropylene layer or may be a separator having a surface coated with resin such as an aramid resin.

EXAMPLES

The present disclosure is further described below in detail with reference to examples and comparative examples. The present disclosure is not limited to the examples below.

Example 1

[Preparation of Positive Electrode Active Material]

A nickel-cobalt-manganese composite hydroxide obtained by mixing and coprecipitating $NiSO_4$, $CoSO_4$, and $MnSO_4$ in an aqueous solution was fired, whereby a nickel-cobalt-manganese composite oxide was prepared. Next, the composite oxide was mixed with lithium carbonate and tungsten oxide ($WO_3$) using a Raikai mortar. In the mixture, the mixing ratio (molar ratio) of lithium to nickel, cobalt, and manganese which were transition metals to tungsten was 1.15:1.0:0.005. The mixture was fired at 900° C. for 10 hours in air, followed by grinding, whereby a lithium transition metal oxide (positive electrode active material) containing W was obtained. The obtained lithium transition metal oxide was subjected to elemental analysis by ICP emission spectrometry, resulting in that the molar ratio of Ni to all the transition metals, that of Co, that of Mn, and that of W were 46.5, 27.5, 26, and 0.5, respectively.

Next, the obtained lithium transition metal oxide was mixed with $WO_3$ and lithium phosphate ($Li_3PO_4$) such that $WO_3$ accounted for 0.5 mol % of the total amount of metal elements (the transition metals), excluding Li, in the oxide and lithium phosphate ($Li_3PO_4$) accounted for 2% by mass of the amount of the oxide, whereby a positive electrode active material having $WO_3$ and $Li_3PO_4$ attached to the surfaces of particles was obtained.

[Preparation of Positive Electrode]

The positive electrode active material, carbon black, and polyvinylidene fluoride (PVDF) were mixed at a mass ratio of 91:7:2. To the mixture, N-methyl-2-pyrrolidone (NMP) serving as a dispersion medium was added, followed by kneading, whereby positive electrode mix slurry was prepared. Next, the positive electrode mix slurry was applied to aluminium foil which was a positive electrode core and a wet film was dried, whereby a positive electrode mix layer was formed on the aluminium foil. The positive electrode core provided with the positive electrode mix layer was cut to a predetermined size and was rolled, followed attaching an aluminium tab thereto, whereby a positive electrode was obtained.

The positive electrode obtained as described above was observed with a scanning electron microscope (SEM), whereby it was confirmed that tungsten oxide particles with an average size of 150 nm and lithium phosphate particles with an average size of 100 nm were attached to the surface of the lithium transition metal composite oxide. Incidentally, since a portion of tungsten oxide and a portion of lithium phosphate are separated from the surface of the positive electrode active material in a step of mixing a conductive agent and a binding material in some cases, a portion of tungsten oxide and/or a portion of lithium phosphate is contained in the positive electrode without being attached to the surfaces of the positive electrode active material particles in some cases. Furthermore, by observation with the SEM, it was confirmed that lithium phosphate was attached to tungsten oxide or was present in the vicinity of tungsten oxide.

[Preparation of Negative Electrode]

A powder of a negative electrode active material in which a noncrystalline carbon material was fixed to the surface of graphite, carboxymethylcellulose (CMC), and styrene-butadiene rubber (SBR) were mixed at a mass ratio of 98:1:1, followed by adding water. This was stirred using a mixer (T.K. HIVIS MIX, manufactured by PRIMIX Corporation), whereby negative electrode mix slurry was prepared. Next, the negative electrode mix slurry was applied to copper foil which was a negative electrode core and wet films were dried, followed by rolling with a rolling roller. In this way, a negative electrode including negative electrode mix layers formed on the copper foil was prepared.

[Preparation of Nonaqueous Electrolyte]

Ethylene carbonate (EC), methyl ethyl carbonate (MEC), and dimethyl carbonate (DMC) were mixed at a volume ratio of 30:30:40. In the solvent mixture, $LiPO_2F_2$ and $LiPF_6$ were dissolved so as to give a concentration of 0.05 mol/L and a concentration of 1.2 mol/L, respectively, followed by further dissolving 0.3% by mass of vinylene carbonate.

[Preparation of Battery]

An aluminium lead was attached to the positive electrode. A nickel lead was attached to the negative electrode. A separator used was a microporous membrane made of polyethylene. The positive electrode and the negative electrode were spirally wound with the separator therebetween, whereby a wound electrode assembly was prepared. The electrode assembly was housed in a battery case body with a bottomed cylindrical shape and the nonaqueous electrolyte was poured thereinto, followed by sealing an opening of the battery case body with a gasket and a sealing body, whereby a cylindrical nonaqueous electrolyte secondary battery (Battery A1) was prepared.

Example 2

A positive electrode was prepared in substantially the same manner as that used in Example 1 except that instead of lithium phosphate, magnesium hydrogen phosphate ($MgHPO_4$) was mixed with a lithium transition metal oxide so as to account for 2% by mass of the amount of the lithium transition metal oxide. The positive electrode was observed with a scanning electron microscope (SEM), whereby it was confirmed that tungsten oxide particles with an average size of 150 nm and magnesium hydrogen phosphate ($MgHPO_4$) particles with an average size of 500 nm were attached to the surface of the lithium transition metal composite oxide. A cylindrical nonaqueous electrolyte secondary battery (Battery A2) was prepared using the prepared positive electrode in the same manner as that used in Example 1.

Example 3

A positive electrode was prepared in substantially the same manner as that used in Example 1 except that instead of lithium phosphate, manganese hydrogen phosphate ($MnHPO_4$) was mixed with a lithium transition metal oxide so as to account for 2% by mass of the amount of the lithium transition metal oxide. The positive electrode was observed with a scanning electron microscope (SEM), whereby it was confirmed that tungsten oxide particles with an average size of 150 nm and manganese hydrogen phosphate ($MnHPO_4$) particles with an average size of 1 μm were attached to the surface of the lithium transition metal composite oxide. A cylindrical nonaqueous electrolyte secondary battery (Battery A3) was prepared using the prepared positive electrode in the same manner as that used in Example 1.

Example 4

A cylindrical nonaqueous electrolyte secondary battery (Battery A4) was prepared in substantially the same manner as that used in Example 3 except that a negative electrode active material was changed to a graphite powder.

Example 5

A nickel-cobalt-manganese composite oxide, lithium carbonate, and niobium oxide ($NbO_2$) were mixed together using a Raikai mortar. In the mixture, the mixing ratio (molar ratio) of lithium to nickel, cobalt, and manganese which were transition metals to niobium was 1.15:1.0:0.005. The mixture was fired at 900° C. for 10 hours in air, followed by grinding, whereby a lithium transition metal oxide (positive electrode active material) containing Nb was obtained. The obtained lithium transition metal oxide was subjected to elemental analysis by ICP emission spectrometry, resulting in that the molar ratio of Ni to all the transition metals, that of Co, that of Mn, and that of Nb were 46.5, 27.5, 26.0, and 0.5, respectively.

Next, the obtained lithium transition metal oxide was mixed with niobium oxide ($NbO_2$) and manganese hydrogen phosphate ($MnHPO_4$) such that $NbO_2$ accounted for 0.5 mol % of the total amount of metal elements (the transition metals), excluding Li, in the oxide and $MnHPO_4$ accounted for 2% by mass of the amount of the oxide, whereby a positive electrode active material having NbO$_2$ and MnHPO$_4$ attached to the surfaces of particles thereof was obtained.

A positive electrode was prepared using the positive electrode active material in the same manner as that used in Example 1. The positive electrode was observed with a scanning electron microscope (SEM), whereby it was confirmed that niobium oxide particles with an average size of 250 nm and manganese hydrogen phosphate particles with an average size of 1 μm were attached to the surface of the lithium transition metal composite oxide. A cylindrical nonaqueous electrolyte secondary battery (Battery A5) was prepared using the prepared positive electrode in the same manner as that used in Example 1.

Example 6

A positive electrode active material was prepared without mixing WO$_3$ and MnHPO$_4$ in a step of preparing the positive electrode active material in Example 3. Next, in a step of preparing a positive electrode, a lithium transition metal oxide, carbon black, and polyvinylidene fluoride (PVDF) were mixed at a mass ratio of 91:7:2, followed by mixing WO$_3$ and MnHPO$_4$. The positive electrode was prepared in substantially the same manner as that used in Example 3 except the above. The positive electrode was observed with a scanning electron microscope (SEM), whereby it was confirmed that tungsten oxide particles with an average size of 150 nm, manganese hydrogen phosphate (MnHPO$_4$) particles with an average size of 1 μm, and the lithium transition metal composite oxide were contained in the positive electrode plate. However, WO$_3$ and MnHPO$_4$ attached to the surface of the positive electrode active material were not present.

A cylindrical nonaqueous electrolyte secondary battery (Battery A6) was prepared using the prepared positive electrode in the same manner as that used in Example 1.

Comparative Example 1

A cylindrical nonaqueous electrolyte secondary battery (Battery B1) was prepared in substantially the same manner as that used in Example 1 except that none of tungsten and lithium phosphate was added in a step of preparing a positive electrode active material or no LiPO$_2$F$_2$ was added in a step of preparing a nonaqueous electrolyte.

Comparative Example 2

A cylindrical nonaqueous electrolyte secondary battery (Battery B2) was prepared in substantially the same manner as that used in Example 1 except that none of tungsten and lithium phosphate was added in a step of preparing a positive electrode active material.

Comparative Example 3

A cylindrical nonaqueous electrolyte secondary battery (Battery B3) was prepared in substantially the same manner as that used in Example 1 except that no lithium phosphate was added in a step of preparing a positive electrode active material.

Comparative Example 4

A cylindrical nonaqueous electrolyte secondary battery (Battery B4) was prepared in substantially the same manner as that used in Example 1 except that no tungsten was added in a step of preparing a positive electrode active material.

Comparative Example 5

A cylindrical nonaqueous electrolyte secondary battery (Battery B5) was prepared in substantially the same manner as that used in Example 1 except that no LiPO$_2$F$_2$ was added in a step of preparing a nonaqueous electrolyte.

[Low-Temperature Regeneration Test]

Constant-current charge was performed up to 4.1 V at a current of 800 mA under 25° C. temperature conditions using the batteries prepared as described above, followed by performing constant-voltage charge at 4.1 V until the current reached 0.1 mA. Thereafter, constant-current discharge was performed down to 2.5 V at 800 mA. The discharge capacity obtained by performing the constant-current discharge was defined as the rated capacity of each secondary battery.

Next, constant-current discharge was performed down to 2.5 V at 800 mA under 25° C. temperature conditions and charge was performed again up to 50% of the rated capacity. Thereafter, the low-temperature regeneration value of each secondary battery at a state of charge (SOC) of 50% was determined by an equation below from the maximum current at which charge could be performed for 10 seconds at a battery temperature of −30° C. when the charge cut-off voltage was 2.0 V.

Low-temperature regeneration value (an SOC of 50%)=(measured maximum current)×charge cut-off voltage (2.0 V)

The proportion of the low-temperature regeneration values of Batteries A1 to A6 of Examples 1 to 5 and Batteries B1 to B5 of Comparative Examples 1 to 5 was calculated on the basis (100%) of the low-temperature regeneration value of Battery B1 of Comparative Example 1. The results are shown in Table 1.

TABLE 1

| | Positive Electrode | | | | Low- |
|---|---|---|---|---|---|
| | Phosphoric Acid Compound | Group 5/6 Element | Electrolyte LiPO2F2 | Noncrystalline Carbon | Temperature Regeneration % |
| Example 1 | Li3PO4 | WO3 | Contained | Contained | 110 |
| Example 2 | MgHPO4 | WO3 | Contained | Contained | 113 |
| Example 3 | MnHPO4 | WO3 | Contained | Contained | 116 |
| Example 4 | MnHPO4 | WO3 | Contained | Not contained | 110 |
| Example 5 | MnHPO4 | Nb2O | Contained | Contained | 110 |
| Example 6 | MnHPO4 | WO3 | Contained | Contained | 109 |
| Comparative Example 1 | Not contained | Not contained | Not contained | Contained | 100 |

TABLE 1-continued

| | Positive Electrode | | | | Low-Temperature Regeneration % |
|---|---|---|---|---|---|
| | Phosphoric Acid Compound | Group 5/6 Element | Electrolyte LiPO2F2 | Noncrystalline Carbon | |
| Comparative Example 2 | Not contained | Not contained | Contained | Contained | 99 |
| Comparative Example 3 | Not contained | WO3 | Contained | Contained | 101 |
| Comparative Example 4 | Li3PO4 | Not contained | Contained | Contained | 101 |
| Comparative Example 5 | Li3PO4 | WO3 | Not contained | Contained | 100 |

As is clear from Table 1, Batteries A1 to A6, which included a positive electrode containing a lithium-nickel-cobalt-manganese composite oxide, a group 5/6 element, and a phosphoric acid compound and a nonaqueous electrolyte containing $LiPO_2F_2$, had increased low-temperature regeneration as compared to Battery B1, which contained none of a group 5/6 element, a phosphoric acid compound, and $LiPO_2F_2$. Batteries B2 to B5, which did not contain either of a group 5/6 element, a phosphoric acid compound, and $LiPO_2F_2$, had mostly unchanged low-temperature regeneration as compared to Battery B1.

Among Batteries A1 to A6, Batteries A2 and A3, in which $MgHPO_4$ or $MnHPO_4$ was used as a phosphoric acid compound, exhibited more excellent low-temperature regeneration. In a comparison between Batteries A3 and A4, Battery A3, in which the negative electrode active material having the noncrystalline carbon material fixed to the surface of graphite was used, exhibited more excellent low-temperature regeneration as compared to Battery A4, in which graphite was a negative electrode active material.

INDUSTRIAL APPLICABILITY

The present invention is applicable to nonaqueous electrolyte secondary batteries.

The invention claimed is:

1. A nonaqueous electrolyte secondary battery comprising a positive electrode, a negative electrode, and a nonaqueous electrolyte,
wherein the positive electrode contains a lithium transition metal oxide, at least one element of a group 5 element and group 6 element in the periodic table, and a phosphoric acid compound represented by the general formula $M_xH_yPO_4$ (M is a metal element, x is 1 to 2, and y is 1 to 2), a particle size of the phosphoric acid compound being within a range of 50 nm to 10 µm and the nonaqueous electrolyte contains a lithium salt containing a P—O bond and a P—F bond.

2. The nonaqueous electrolyte secondary battery according to claim 1, wherein the positive electrode includes particles of a positive electrode active material, at least one element of the group 5 element and group 6 element in the periodic table and the phosphoric acid compound being attached to the particles.

3. The nonaqueous electrolyte secondary battery according to claim 1, a content of the phosphoric acid compound is 0.1% by mass to 5% by mass with respect to a total amount of the lithium transition metal oxide.

4. The nonaqueous electrolyte secondary battery according to claim 1, wherein the lithium transition metal oxide includes niobium, the phosphoric acid compound includes manganese hydrogen phosphate ($MnHPO_4$), and the positive electrode contains niobium oxide.

5. The nonaqueous electrolyte secondary battery according to claim 1, wherein the lithium transition metal oxide includes tungsten, the phosphoric acid compound includes manganese hydrogen phosphate ($MnHPO_4$), and the positive electrode contains tungsten oxide.

6. The nonaqueous electrolyte secondary battery according to claim 1, wherein the negative electrode contains a graphitic carbon material and a noncrystalline carbon material fixed to a surface of the graphitic carbon material.

7. The nonaqueous electrolyte secondary battery according to claim 1, wherein the lithium salt is a lithium salt represented by the general formula $Li_xP_yO_zF_\alpha$ (x is an integer of 1 to 4, y is 1 or 2, z is an integer of 1 to 8, and α is an integer of 1 to 4).

8. The nonaqueous electrolyte secondary battery according to claim 1, wherein the lithium salt is lithium monofluorophosphate or lithium difluorophosphate.

* * * * *